(12) United States Patent
Asanuma et al.

(10) Patent No.: US 8,434,297 B2
(45) Date of Patent: May 7, 2013

(54) EXHAUST PURIFICATION SYSTEM OF INTERNAL COMBUSTION ENGINE

(75) Inventors: Takamitsu Asanuma, Mishima (JP); Kohei Yoshida, Gotenba (JP); Hiromasa Nishioka, Susono (JP); Daichi Imai, Susono (JP); Kazuhiro Umemoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 291 days.

(21) Appl. No.: 12/673,888

(22) PCT Filed: Jun. 15, 2009

(86) PCT No.: PCT/JP2009/061252
§ 371 (c)(1),
(2), (4) Date: Feb. 17, 2010

(87) PCT Pub. No.: WO2010/146718
PCT Pub. Date: Dec. 23, 2010

(65) Prior Publication Data
US 2011/0209462 A1 Sep. 1, 2011

(51) Int. Cl.
*F01N 3/10* (2006.01)
*F01N 3/20* (2006.01)

(52) U.S. Cl.
USPC .............. 60/286; 60/285; 60/287; 60/288; 60/295

(58) Field of Classification Search .......... 60/285, 60/295, 286, 287, 288
See application file for complete search history.

(56) References Cited

U.S. PATENT DOCUMENTS

| 6,698,188 B2 * | 3/2004 | Irisawa et al. ............ 60/285 |
| 7,204,079 B2 * | 4/2007 | Audoin .................... 60/277 |
| 2006/0196175 A1 * | 9/2006 | Endicott et al. ........... 60/295 |
| 2008/0241034 A1 | 10/2008 | Schwefer et al. |

FOREIGN PATENT DOCUMENTS

| JP | A-08-177466 | 7/1996 |
| JP | A-09-000084 | 1/1997 |
| JP | A-2001-012231 | 1/2001 |
| JP | A-2004-211676 | 7/2004 |
| JP | A-2008-540094 | 11/2008 |

OTHER PUBLICATIONS

International Search Report issued in Application No. PCT/JP2009/061252; Mailed on Aug. 18, 2009 (With Translation).

* cited by examiner

*Primary Examiner* — Kenneth Bomberg
*Assistant Examiner* — Brandon Lee
(74) *Attorney, Agent, or Firm* — Oliff & Berridge, PLC

(57) ABSTRACT

An electronic control unit executing an algorithm so as to operate an exhaust purification system of an engine. The algorithm (1) commences a regeneration treatment by causing an amount of fuel supplied to a combustion process of the engine to increase so as to change an air-fuel ratio of exhaust gas of the engine from a first lean air-fuel ratio to a set rich air-fuel ratio and (2) causes uncombusted fuel to be supplied to a NOx catalyst device during at least one of: a first period in which an air-fuel ratio of the exhaust gas within the NOx catalyst device changes from the first lean air-fuel ratio to the set rich air-fuel ratio when the regeneration treatment is started; and a second period after an air-fuel ratio of the exhaust gas within the NOx catalyst device becomes a ratio indicating completion of the regeneration treatment.

3 Claims, 2 Drawing Sheets

EXHAUST PURIFICATION SYSTEM OF INTERNAL COMBUSTION ENGINE

TECHNICAL FIELD

The present invention relates to an exhaust purification system of an internal combustion engine.

BACKGROUND ART

In an exhaust system of an internal combustion engine which performs lean combustion such as in a diesel engine, a $NO_X$ catalyst device is arranged to purify $NO_X$ in the exhaust gas. One suggested $NO_X$ catalyst device satisfactorily stores $NO_X$ in the exhaust gas when the air-fuel ratio of the exhaust gas is lean, namely when the concentration of oxygen in the exhaust gas is high. On the other hand, as a regeneration treatment, when the air-fuel ratio of the exhaust gas is made the stoichiometric air-fuel ratio or a rich air-fuel ratio, namely, when the concentration of oxygen is decreased, the $NO_X$ catalyst device releases the stored $NO_X$ and purifies the released $NO_X$ to $N_2$ by reducing materials in the exhaust gas.

However, during the regeneration treatment, $N_2O$ (dinitrogen monoxide) can be produced. It is also undesirable to release $N_2O$ into the atmosphere. Accordingly, an exhaust purification system of an internal combustion engine is suggested, which is intended to reduce an amount of $N_2O$ flowing out from the $NO_X$ catalyst device during the regeneration treatment (for example, refer to Japanese Unexamined Patent Publication No. 2004-211676).

DISCLOSURE OF THE INVENTION

In the above exhaust purification system of an internal combustion engine, because an amount of $N_2O$ produced during the regeneration treatment increases when an concentration of oxygen in the exhaust gas is high, additional fuel is not supplied to the exhaust passage, but a combustion air-fuel ratio is made rich so as to lower the concentration of oxygen in the exhaust gas for the regeneration treatment before flowing into the $NO_X$ catalyst device. When the combustion air-fuel ratio is rich, the concentration of oxygen in the exhaust gas is not only lowered but the exhaust gas also includes CO and HC changed so as to have a low boiling point as reducing materials, which can satisfactorily reduce $NO_X$.

Thus, when the combustion air-fuel ratio is made rich in the regeneration treatment, an amount of $N_2O$ produced during the regeneration treatment can be generally reduced. However, a large amount of $N_2O$ can be temporarily produced by the regeneration treatment, and thus an amount of $N_2O$ flowing out from the $NO_X$ catalyst device cannot be sufficiently reduced.

Accordingly, an object of the present invention is to provide an exhaust purification system of an internal combustion engine comprising a $NO_X$ catalyst device which can satisfactorily store $NO_X$ in the exhaust gas when the concentration of oxygen in the exhaust gas is high and can release the stored $NO_X$ and purifies to reduce the released $NO_X$ to $N_2$ by reducing materials in the exhaust gas when the concentration of oxygen is decreased as a regeneration treatment, in which an amount of $N_2O$ flowing out from the $NO_X$ catalyst device by the regeneration treatment, in which a combustion air-fuel ratio is made rich, can be sufficiently reduced.

An exhaust purification system of an internal combustion engine, comprising a $NO_X$ catalyst device which can satisfactorily store $NO_X$ in the exhaust gas when the concentration of oxygen in the exhaust gas is high and can release the stored $NO_X$ and purifies to reduce the released $NO_X$ to $N_2$ by reducing materials in the exhaust gas when the concentration of oxygen is decreased as a regeneration treatment, is provided, characterized in that the regeneration treatment is carried out to change a combustion air-fuel ratio from a lean air-fuel ratio to a set rich air-fuel ratio, and $N_2O$ reducing material is supplied to the $NO_X$ catalyst device during at least one of a first period set within a period in which an air-fuel ratio in the exhaust gas within the $NO_X$ catalyst device changes from the lean air-fuel ratio to the set rich air-fuel ratio when the regeneration treatment is started and a second period set within a period after an air-fuel ratio in the exhaust gas within the $NO_X$ catalyst device becomes the stoichiometric air-fuel ratio when the regeneration treatment is finished.

An exhaust purification system of an internal combustion engine characterized in that the first period is set so as to start from when a first set time elapses after the combustion air-fuel ratio is changed from the lean air-fuel ratio to the set rich air-fuel ratio to start the regeneration treatment.

An exhaust purification system of an internal combustion engine characterized in that the second period is set so as to start from when a second set time elapses after the combustion air-fuel ratio is changed from the set rich air-fuel ratio to a lean air-fuel ratio to finish the regeneration treatment.

An exhaust purification system of an internal combustion engine characterized in that the $N_2O$ reducing material is fuel with a higher boiling point than that of HC included in the exhaust gas during the regeneration treatment.

An exhaust purification system of an internal combustion engine characterized in that the $N_2O$ reducing material is supplied to the $NO_X$ catalyst device with the exhaust gas after it is supplied within the cylinder in an expansion stroke or an exhaust stroke.

An exhaust purification system of an internal combustion engine characterized in that the $N_2O$ reducing material is supplied to the $NO_X$ catalyst device with the exhaust gas after it is supplied to the exhaust passage upstream of the $NO_X$ catalyst device.

According to the exhaust purification system of an internal combustion engine, comprising a $NO_X$ catalyst device which can satisfactorily store $NO_X$ in the exhaust gas when the concentration of oxygen in the exhaust gas is high and can release the stored $NO_X$ and purifies the released $NO_X$ to $N_2$ by reducing materials in the exhaust gas when the concentration of oxygen is decreased as a regeneration treatment, the regeneration treatment is carried out to change a combustion air-fuel ratio from a lean air-fuel ratio to a set rich air-fuel ratio. Therefore, during a first period set within a period in which the air-fuel ratio in the exhaust gas within the $NO_X$ catalyst device changes from the lean air-fuel ratio to the set rich air-fuel ratio when the regeneration treatment is started, an air-fuel ratio in the exhaust gas flowing into the $NO_X$ catalyst device can be approximately the stoichiometric air-fuel ratio in which the released $NO_X$ cannot be sufficiently reduced and $N_2O$ can be easily produced. On the other hand, during a second period set within a period after the air-fuel ratio in the exhaust gas within the $NO_X$ catalyst device becomes the stoichiometric air-fuel ratio when the regeneration treatment is finished, ammonia $NH_3$ produced by reducing $NO_X$ in the regeneration treatment is easily oxidized so as to produce $N_2O$. Accordingly, during at least one of the first period and the second period, $N_2O$ reducing material is supplied to the $NO_X$ catalyst device and thus the produced $N_2O$ can be reduced to $N_2$ or NO to sufficiently reduce an amount of $N_2O$ flowing out from the $NO_X$ catalyst device.

According to the exhaust purification system of the internal combustion engine, the first period starts from when the first set time elapses after the combustion air-fuel ratio is changed from the lean air-fuel ratio to the set rich air-fuel ratio to start the regeneration treatment. Accordingly, during the first period, $N_2O$ reducing material can be supplied to the $NO_X$ catalyst device on the basis of the first time.

According to the exhaust purification system of an internal combustion engine, the second period starts from when the second set time elapses after the combustion air-fuel ratio is changed from the set rich air-fuel ratio to a lean air-fuel ratio to finish the regeneration treatment. Accordingly, during the second period, $N_2O$ reducing material can be supplied to the $NO_X$ catalyst device on the basis of the second time.

According to the exhaust purification system of an internal combustion engine, the $N_2O$ reducing material is fuel with a higher boiling point than that of HC included in the exhaust gas during the regeneration treatment. Thus, HC with a high boiling point remains in the $NO_X$ catalyst device more easily than HC included in the exhaust gas during the regeneration treatment and can satisfactorily reduce $N_2O$ which is more difficult to be reduced than $NO_X$.

Accordingly to the exhaust purification system of an internal combustion engine, the $N_2O$ reducing material is supplied to the $NO_X$ catalyst device with the exhaust gas after it is supplied within the cylinder in an expansion stroke or an exhaust stroke. Thus, the $N_2O$ reducing material does not change to HC with a low boiling point like HC included in the exhaust gas during the regeneration treatment in which the combustion air-fuel ratio is changed from the lean air-fuel ratio to the set rich air-fuel ratio, and can be supplied to the $NO_X$ catalyst device as HC with a high boiling point.

Accordingly to the exhaust purification system of an internal combustion engine, the $N_2O$ reducing material is supplied to the $NO_X$ catalyst device with the exhaust gas after it is supplied to the exhaust passage upstream of the $NO_X$ catalyst device. Thus, the $N_2O$ reducing material does not change to BC with a low boiling point like HC included in the exhaust gas during the regeneration treatment in which the combustion air-fuel ratio is changed from the lean air-fuel ratio to the set rich air-fuel ratio, and can be supplied to the $NO_X$ catalyst device as HC with a high boiling point.

BEST MODE FOR CARRYING OUT THE INVENTION

Figure 1:
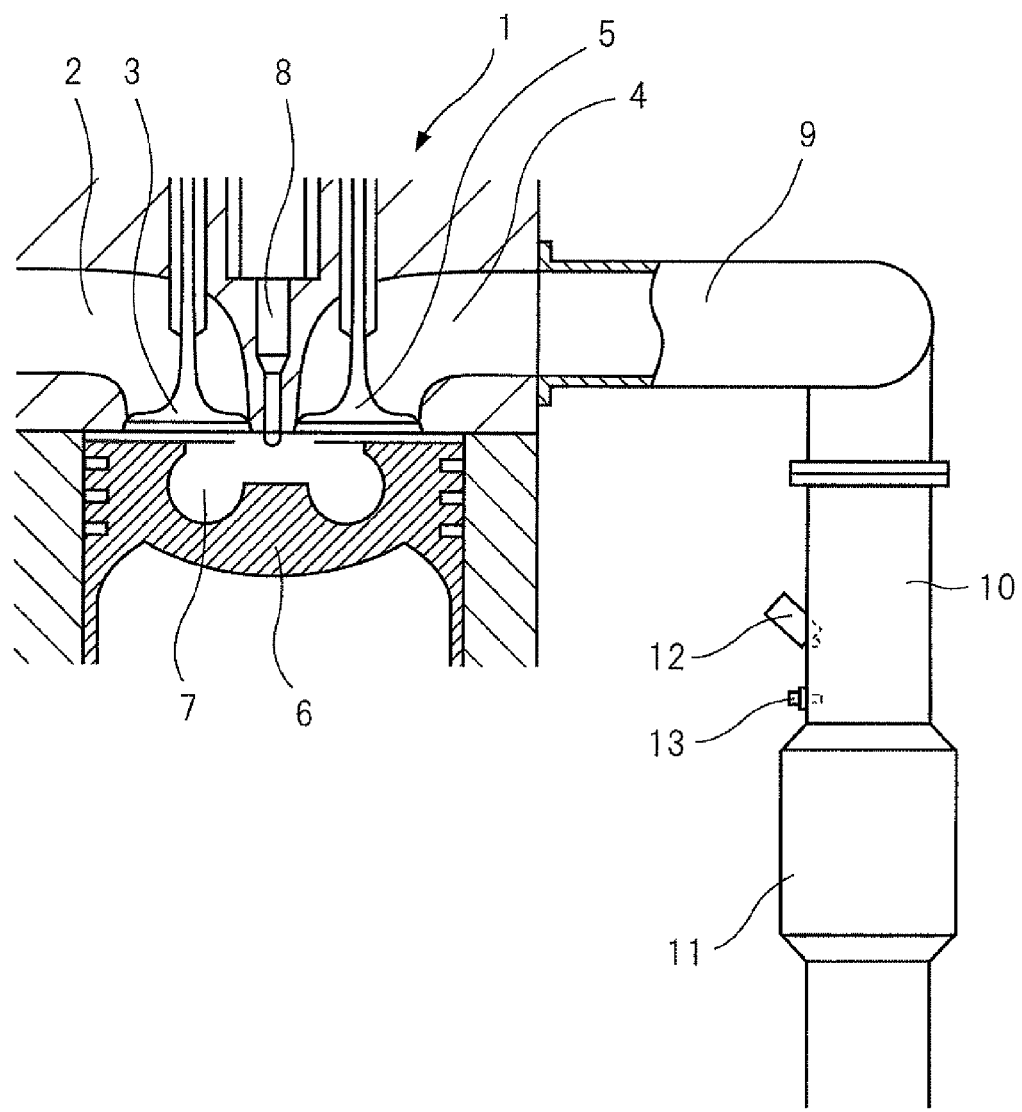
FIG. 1 is a schematic view showing an embodiment of the exhaust purification system of an internal combustion engine according to the present invention.

FIG. 1 is a schematic view showing an embodiment of the exhaust purification system of an internal combustion engine according to the present invention. In FIG. 1, reference numeral 1 is an internal combustion engine. The engine 1 is a diesel engine, but may be a direct fuel injection-type spark-ignition engine, which performs lean combustion. Reference numeral 2 is a pair of intake ports communicating with a cylinder via a pair of intake valves 3. Reference numeral 4 is a pair of exhaust ports communicating with a cylinder via a pair of exhaust valves 5. Reference numeral 6 is a piston. Reference numeral 7 is a combustion chamber formed on the top surface of the piston 6. Reference numeral 8 is a fuel injector for injecting fuel into the combustion chamber 7. Reference numeral 9 is an exhaust manifold connected to every exhaust ports of the cylinders. Reference numeral 10 is a single exhaust passage downstream of the exhaust manifold 9.

The exhaust gas of the engine 1, which performs lean combustion like a diesel engine or a direct fuel injection-type spark-ignition engine, includes a relatively large amount of $NO_X$ so that the $NO_X$ catalyst device 11 for purifying $NO_X$ is arranged in the exhaust passage 10. A fuel supplying device 12 for supplying fuel is arranged in the exhaust passage 10 immediately upstream of the $NO_X$ catalyst device 11. Reference numeral 13 is an air-fuel ratio sensor for detecting an air-fuel ratio of the exhaust gas flowing into the $NO_X$ catalyst device 11.

The $NO_X$ catalyst device 11 carries a $NO_X$ hold agent and noble metal catalyst, such as platinum Pt. The $NO_X$ hold agent is at least one element selected from for example potassium K, sodium Na, lithium Li, cesium Cs, or another alkali metal, barium Ba, calcium Ca, or another alkali earth metal, and lanthanum La, yttrium Y, or another rare earth.

The $NO_X$ catalyst device 11 satisfactorily holds $NO_X$ in the exhaust gas so as to absorb $NO_X$ as nitrate or so as to adsorb $NO_X$ as $NO_2$ when the air-fuel ratio of the exhaust gas is lean, i.e., when the oxygen concentration of the exhaust gas is high. However, the $NO_X$ catalyst device cannot hold $NO_X$ without limitation. Accordingly, before the $NO_X$ catalyst device does not sufficiently hold $NO_X$ because an amount of $NO_X$ held in the $NO_X$ catalyst device has reached the largest amount of $NO_X$ that can be held therein, the air-fuel ratio of the exhaust gas is changed to a rich air-fuel ratio as the regeneration treatment, namely, the concentration of oxygen of the exhaust gas is lowered. Therefore, the held $NO_X$ is separated, namely, the absorbed $NO_X$ is released or the adsorbed $NO_X$ is disconnected, and thereafter the separated $NO_X$ is reduced and purified to $N_2$ by reducing materials in the exhaust gas.

To start the regeneration treatment, an amount of fuel injected by the fuel injector 8 in a compression stroke is increased or additional fuel is injected by the fuel injector 8 during combustion in an initial stage of expansion stroke so that a combustion air-fuel ratio is changed from a lean air-fuel ratio in usual engine operations to a set rich air-fuel ratio and thus the exhaust gas of the set rich air-fuel ratio flows into the $NO_X$ catalyst device 11. When predetermined regeneration time elapses so that the held $NO_X$ is almost separated from the $NO_X$ catalyst device 11, the combustion air-fuel ratio is returned from the set rich air-fuel ratio to the lean air-fuel ratio in usual engine operations to finish the regeneration treatment. The lean air-fuel ratio after the regeneration treatment is not always identical to the lean air-fuel ratio before the regeneration treatment. In the regeneration treatment, the increased fuel injected in a compression stroke may be continuously injected or may be injected to be divided into two or three parts. The additional fuel injected in the initial stage of expansion stroke may be injected in series with the fuel injection in the final stage of compression stroke or separately therefrom.

By the regeneration treatment, $N_2O$ (dinitrogen monoxide) can be produced in the $NO_X$ catalyst device 11. Because $N_2O$ is undesirable to be released into the atmosphere, it is required to decrease an amount of $N_2O$ flowing out from the $NO_X$ catalyst device 11.

Figure 2:
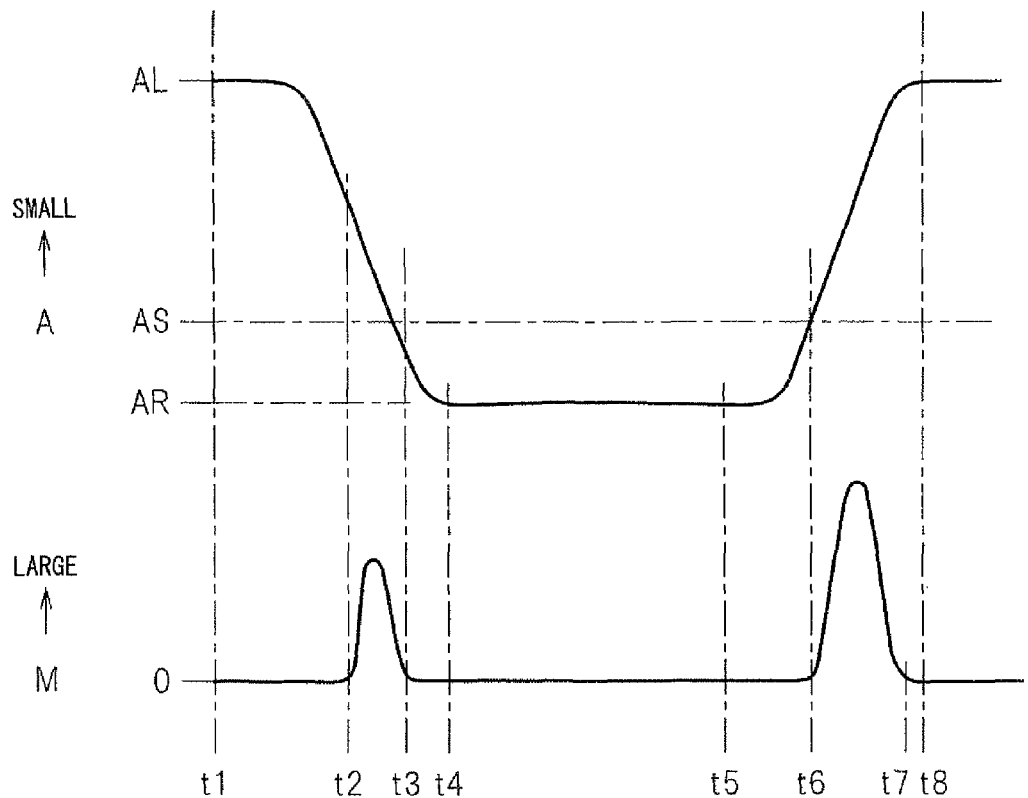
FIG. 2 is time charts showing changes of an air-fuel ratio in the $NO_X$ catalyst device and of an amount of produced $N_2O$ during the regeneration treatment.

FIG. 2 is time-charts showing changes of an air-fuel ratio (A) in the $NO_X$ catalyst device 11 and of an amount of produced $N_2O$ (M) during the regeneration treatment. In FIG. 2, a time (t1) is a regeneration control starting time at when the combustion air-fuel ratio is changed from the lean air-fuel ratio (AL) (for example 22) to the set rich air-fuel ratio (AR) (for example 12). After the combustion air-fuel ratio is changed to the rich air-fuel ratio (AR), the air-fuel ratio (A) in the $NO_X$ catalyst device 11 does not immediately become the rich air-fuel ratio (AR) because there is the exhaust gas of the lean air-fuel ratio (AL) in the exhaust manifold 9 and the exhaust passage 10 upstream of the $NO_X$ catalyst device 11, gradually changes from the lean air-fuel ratio (AL) to the rich side, and becomes the set rich air-fuel ratio (AR) at a time (t4). Thus, during a first period between a time (t2) and a time (t3) within the period (from the time (t1) to the time (t4)) in which the air-fuel ratio in the exhaust gas within the $NO_X$ catalyst device 11 changes from the lean air-fuel ratio (AL) to the set rich air-fuel ratio (AR) to start the regeneration treatment, the air-fuel ratio in the exhaust gas flowing into the $NO_X$ catalyst device 11 can be (for example from 18 to 14) about the stoichiometric air-fuel ratio (AS) (for example 14.7) in which the separated $NO_X$ and the $NO_X$ included in the exhaust gas cannot be sufficiently reduced and $N_2O$ can be easily produced (NO+N→$N_2O$). Thus, the first period starts from the time (t2) when first set time elapses from the regeneration control starting time (t1) (when the combustion air-fuel ratio is changed from the lean air-fuel ratio (AL) to the set rich air-fuel ratio (AR)). The smaller a total volume of the exhaust manifold 9 and the exhaust passage 10 upstream of the $NO_X$ catalyst device 11 is, the shorter the first set time is. The smaller a difference between the lean air-fuel ratio (AL) and the stoichiometric air-fuel ratio (AS) is, the shorter the first set time is. The larger a difference between the stoichiometric air-fuel ratio (AS) and the set rich air-fuel ratio (AR) is, the shorter the first set time is.

A time (t5) is a regeneration control finishing time at when the combustion air-fuel ratio is changed from the set rich air-fuel ratio (AR) to the lean air-fuel ratio (AL). After the combustion air-fuel ratio is changed to the lean air-fuel ratio (AL), the air-fuel ratio (A) in the $NO_X$ catalyst device 11 does not immediately become the lean air-fuel ratio (AL) because there is the exhaust gas of the set rich air-fuel ratio (AR) filled with the exhaust manifold 9 and the exhaust passage 10 upstream of the $NO_X$ catalyst device 11, gradually changes from the rich air-fuel ratio (AR) to the lean side, and becomes the lean air-fuel ratio (AL) at a time (t8).

Incidentally, during the regeneration treatment, ammonia $NH_3$ is produced by reducing $NO_X$. Almost all the produced $NH_3$ remains in the $NO_X$ catalyst device 11 so as to be adsorbed on the substrate thereof or the like, and thus does not flow out therefrom.

Accordingly, after the air-fuel ratio of the exhaust gas in the $NO_X$ catalyst device becomes the stoichiometric air-fuel ratio (AS) (after a time (t6)), almost all ammonia in the $NO_X$ catalyst device 11 is oxidized by for example oxygen in the exhaust gas and $N_2O$ is easily produced ($2NH_3+2O_2 \rightarrow N_2O+3H_2O$). Thus, during a second period between the time (t6) and a time (t7) within a period after the air-fuel ratio in the exhaust gas within the $NO_X$ catalyst device becomes the stoichiometric air-fuel ratio (AS) to finish the regeneration treatment, $N_2O$ is easily produced. When an amount of $NH_3$ produced during the regeneration treatment is large, the time (t7) to finish the second period may be after the time (t8) at when the air-fuel ratio of the exhaust gas in the $NO_X$ catalyst device changes to the lean air-fuel ratio (AL). Thus, the second period starts from the time (t6) when second set time elapses from the regeneration control finishing time (t5) (when the combustion air-fuel ratio is changed from the set rich air-fuel ratio (AR) to the lean air-fuel ratio (AL)). The smaller the total volume of the exhaust manifold 9 and the exhaust passage 10 upstream of the $NO_X$ catalyst device 11 is, the shorter the second set time is. The smaller a difference between the stoichiometric air-fuel ratio (AS) and the set rich air-fuel ratio (AR) is, the shorter the second set time is. The larger a difference between the lean air-fuel ratio (AL) and the stoichiometric air-fuel ratio (AS) is, the shorter the second set time is.

In the present embodiment, during at least one of the first period (from the time (t2) to the time (t3)) and the second period (from the time (t6) to the time (t7)), preferably during both of the first period and the second period, $N_2O$ reducing material is supplied to the $NO_X$ catalyst device to reduce the produced $N_2O$ to $N_2$ or NO. Accordingly, an amount of $N_2O$ flowing out from the $NO_X$ catalyst device 11 by the regeneration treatment can be sufficiently reduced. The larger an amount of $N_2O$ produced during the first period or the second period is, it is preferable that the more an amount of $N_2O$ reducing material is.

Figure 3:
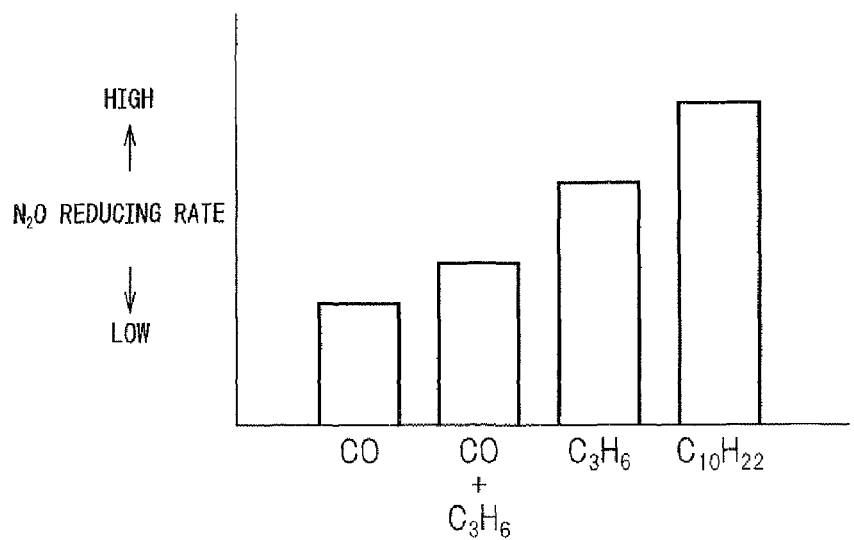
FIG. 3 is graphs showing $N_2O$ reducing rate of each reducing material.

FIG. 3 is graphs showing $N_2O$ reducing rate of each reducing material. As shown in FIG. 3, because HC with a high boiling point like for example $C_{10}H_{22}$ remains in the $NO_X$ catalyst device 11 more easily than CO or HC with a low boiling point like for example $C_3H_6$, HC with a high boiling point can reduce $N_2O$, which is more difficult to be reduced than $NO_X$, more satisfactorily than CO or HC with a low boiling point. On the contrary, $NO_X$ reducing rate of CO or HC with a low boiling point is higher than $NO_X$ reducing rate of HC with a high boiling point.

Accordingly, in the present embodiment, as the $N_2O$ reducing material, fuel with a higher boiling point than that of HC with a low boiling point included in the exhaust gas of the rich air-fuel combustion during the regeneration treatment is used. On the other hand, CO and HC with a low boiling point included in the exhaust gas of the rich air-fuel combustion during the regeneration treatment are used to reduce $NO_X$.

For example, fuel used as the $N_2O$ reducing material is supplied to the $NO_X$ catalyst device with the exhaust gas after it is injected into the cylinder in an expansion stroke (the latter half of an expansion stroke) or an exhaust stroke by the fuel injector 8. Thus, the $N_2O$ reducing material does not change to HC with a low boiling point and is supplied to the $NO_X$ catalyst device as HC with a high boiling point. If fuel is injected into the cylinder during the combustion, the fuel is changed to HC with a low boiling point. An amount of the $N_2O$ reducing material is determined on the basis of an amount of produced $N_2O$. The determined amount of the $N_2O$ reducing material is divided into the number of the cylinders and the divided amount of the $N_2O$ reducing material is injected into every cylinder. If necessary, the divided amount of the $N_2O$ reducing material is divided so as to be injected into the several cycles of one cylinder.

A fuel injection starting time of the fuel injector 8 is set between the time (t1) and the time (t2) such that fuel as the $N_2O$ reducing material is supplied to the $NO_X$ catalyst device 11 with the exhaust gas during the first period (from the time (t2) to the time (t3)). Fuel as the $N_2O$ reducing material is injected separately from fuel to realize the set rich air-fuel ratio (AR) in the combustion.

Further, a fuel injection starting time of the fuel injector 8 is set between the time (t5) and the time (t6) such that fuel as the $N_2O$ reducing material is supplied to the $NO_X$ catalyst device 11 with the exhaust gas during the second period (from the time (t6) to the time (t7)). Fuel as the $N_2O$ reducing material is injected separately from fuel to realize the lean air-fuel ratio (AL) in the combustion.

Fuel used as the $N_2O$ reducing material may be supplied to the $NO_X$ catalyst device with the exhaust gas after it is supplied to the exhaust passage by the fuel supplying device 12 arranged immediately upstream of the $NO_X$ catalyst device 11. Thus, the $N_2O$ reducing material does not change to HC with a low boiling point and is supplied to the $NO_X$ catalyst device as HC with a high boiling point. An amount of the $N_2O$ reducing material is determined on the basis of an amount of produced $N_2O$. The determined amount of the $N_2O$ reducing material is supplied continuously or intermittently by the fuel supplying device 12.

A fuel supply starting time of the fuel supplying device 12 is set between the time (t1) and the time (t2) such that fuel as the $N_2O$ reducing material is supplied to the $NO_X$ catalyst device 11 with the exhaust gas during the first period (from the time (t2) to the time (t3)). Fuel as the $N_2O$ reducing material is supplied separately from fuel to realize the set rich air-fuel ratio (AR) in the combustion.

Further, a fuel supply starting time of the fuel supplying device 12 is set between the time (t5) and the time (t6) such that fuel as the $N_2O$ reducing material is supplied to the $NO_X$ catalyst device 11 with the exhaust gas during the second period (from the time (t6) to the time (t7)). Fuel as the $N_2O$ reducing material is supplied separately from fuel to realize the lean air-fuel ratio (AL) in the combustion.

Thus, the fuel injector 8 or the fuel supplying device 12 is controlled by an electronic control unit. In the electronic control unit, it is determined if it is time to regenerate the $NO_X$ catalyst device 11. For example, an upstream side $NO_X$ sensor is arranged immediately upstream of the $NO_X$ catalyst device 11 to detect a concentration of $NO_X$ of the exhaust gas flowing into the $NO_X$ catalyst device 11 and an downstream side $NO_X$ sensor is arranged immediately downstream of the $NO_X$ catalyst device to detect a concentration of $NO_X$ of the exhaust gas flowing out from the $NO_X$ catalyst device 11. When a difference between the detected concentration of $NO_X$ of the exhaust gas flowing into the $NO_X$ catalyst device 11 and the detected concentration of $NO_X$ of the exhaust gas flowing out from the $NO_X$ catalyst device 11 lowers below a set value, it can be determined that it is the time to regenerate the $NO_X$ catalyst device because an amount of $NO_X$ held in the $NO_X$ catalyst device 11 reaches the amount of $NO_X$ that can be held in the $NO_X$ catalyst device 11 and the $NO_X$ catalyst device does not sufficiently hold $NO_X$.

The downstream side NO sensor may not be arranged. A concentration of $NO_X$ in the exhaust gas flowing into the $NO_X$ catalyst device 11 is detected by the upstream side $NO_X$ sensor. An amount of $NO_X$ per a unit time in the exhaust gas can be estimated on the basis of the detected concentration of $NO_X$ and a set rate of the amount of $NO_X$ per a unit time will be held in the $NO_X$ catalyst device per a unit time. Accordingly, the amount of $NO_X$ held in the $NO_X$ catalyst device 11 per a unit time is integrated to estimate a current amount of $NO_X$ held in the $NO_X$ catalyst device 11. When the current amount of $NO_X$ held in the $NO_X$ catalyst device 11 reaches a set amount, it may be determined that it is the time to regenerate the $NO_X$ catalyst device 11. The upstream side $NO_X$ sensor may not be arranged. A current amount of $NO_X$ per a unit time in the exhaust gas can be preset on the basis of a current engine operation and a set rate of the current amount of $NO_X$ per a unit time will be held in the $NO_X$ catalyst device per a unit time. Accordingly, the amount of $NO_X$ held in the $NO_X$ catalyst device 11 per a unit time is integrated to estimate a current amount of $NO_X$ held in the $NO_X$ catalyst device 11. When the current amount of $NO_X$ held in the $NO_X$ catalyst device 11 reaches a set amount, it may be determined that it is the time to regenerate the $NO_X$ catalyst device 11.

The air-fuel sensor 13 can detect the air-fuel ratio of the exhaust gas flowing into the $NO_X$ catalyst device 11.

LIST OF REFERENCE NUMERALS

1: internal combustion engine
11: $NO_X$ catalyst device
12. fuel supplying device

The invention claimed is:

1. An exhaust purification system of an internal combustion engine comprising:
   a NOx catalyst device for storing NOx;
   an exhaust passage located upstream of the NOx catalyst device;
   an electronic control unit including instructions for causing the electronic control unit, when an amount of NOx held by the NOx catalyst device of the exhaust purification system reaches a predetermined threshold, to perform the steps of:
   commencing a regeneration treatment by causing an amount of fuel supplied to a combustion process of the internal combustion engine to increase so as to change an air-fuel ratio of exhaust gas of the internal combustion engine from a first lean air-fuel ratio to a set rich air-fuel ratio; and
   supplying uncombusted fuel with a higher boiling point than that of combusted fuel to the exhaust gas in the exhaust passage, so that the uncombusted fuel is combined with the combusted fuel present in the exhaust gas and the combination is supplied to the NOx catalyst device, during at least one of:
   a first period in which an air-fuel ratio of the exhaust gas within the NOx catalyst device gradually changes from the first lean air-fuel ratio to the set rich air-fuel ratio when the regeneration treatment is started, and
   a second period set after an air-fuel ratio of the exhaust gas within the NOx catalyst device becomes a stoichiometric air-fuel ratio indicative of the regeneration treatment being completed.

2. The exhaust purification system of an internal combustion engine as set forth in claim 1, wherein the first period is set to start when a first set time elapses after the air-fuel ratio is changed from the first lean air-fuel ratio to the set rich air-fuel ratio to start the regeneration treatment.

3. The exhaust purification system of an internal combustion engine as set forth in claim 1, wherein the second period is set to start when a second set time elapses after the air-fuel ratio is changed from the set rich air-fuel ratio to either the first or a second lean air-fuel ratio to finish the regeneration treatment.

* * * * *